Nov. 8, 1927.

C. A. HATCHER 1,648,344

ARTICLE OF MANUFACTURE

Filed Nov. 6. 1926

Inventor
C.A. HATCHER
By
Attorney

Patented Nov. 8, 1927.

1,648,344

UNITED STATES PATENT OFFICE.

CLAUD A. HATCHER, OF COLUMBUS, GEORGIA, ASSIGNOR TO NEHI, INC., OF COLUMBUS, GEORGIA, A CORPORATION OF GEORGIA.

ARTICLE OF MANUFACTURE.

Application filed November 6, 1926. Serial No. 146,786.

This invention relates to an article of manufacture and more particularly to an advertising device.

An important object of the invention is to provide an advertising novelty including a container formed to simulate two or more objects and having two or more bodies of liquid of different specific gravities therein whereby such liquids will separate in such a manner, when the device is in normal position, as to fill each of the simulated objects.

A further object is to provide an advertising novelty of the above mentioned character wherein the container is made of glass or other transparent material and wherein the bodies of liquid are differently colored to impart different color effects to the simulated objects.

A further object is to provide a device of the above mentioned character including a pair of hollow communicating objects arranged one above the other and formed integral to provide a container, the container preferably being of glass or other transparent material, and to provide a pair of bodies of liquid of different colors and specific gravities whereby such liquids will provide color effects for the objects comprising the container, the heavier body of liquid being adapted to exactly fill the lower object whereby the device will present the appearance of a pair of separate superimposed objects.

A further object is to provide an advertising novelty of the character just referred to wherein the two liquids employed are not miscible one with the other, such as water and an oil.

A further object is to provide such an advertising novelty, wherein the coloring matter employed for each body of liquid is not soluble in the other body, whereby both the liquids and their coloring matters normally separate from each other.

Other objects and advantages of the invention will become apparent during the course of the following description.

In the drawings I have shown one embodiment of the invention. In this showing,

Figure 1:
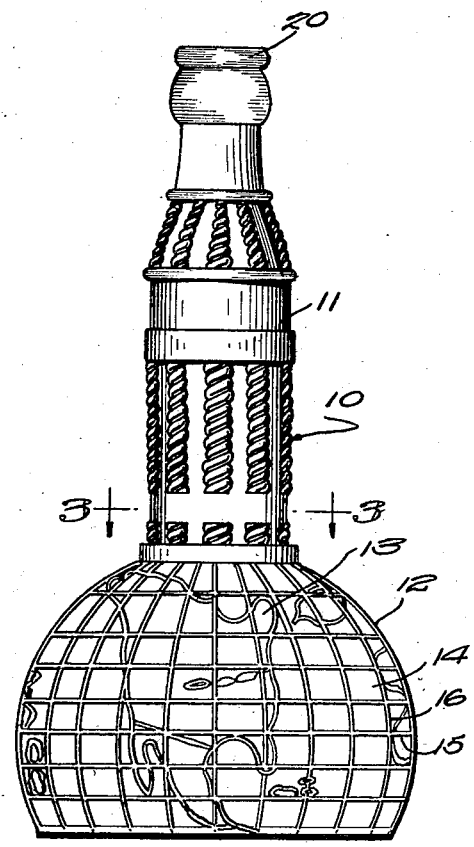
Figure 1 is a side elevation of the device.
Figure 2:
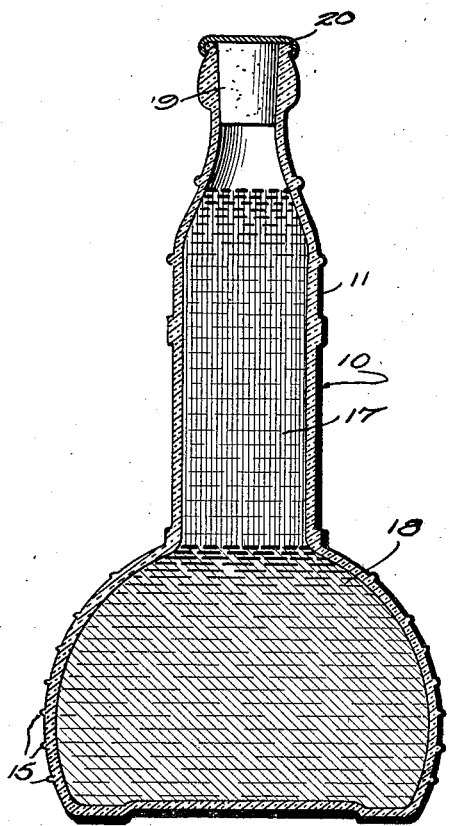
Figure 2 is a central vertical sectional view.
Figure 3:
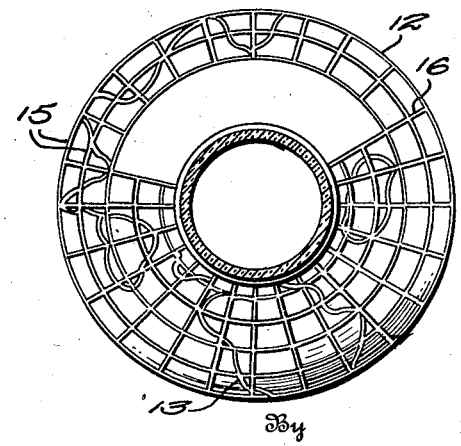
Figure 3 is a section on line 3—3 of Figure 1.

Referring to the drawings, the numeral 10 designates a container as a whole preferably formed of transparent material such as glass. The container is formed of upper and lower sections 11 and 12 which communicate with each other, as shown in Figure 2, and the sections of the container simulate different objects according to the use to which the device is to be put. In the embodiment of the invention illustrated, the device is adapted for use as an advertisement for soft drinks or the like which are sold in bottles, and accordingly the upper section 11 is formed to simulate a soft drink bottle. The lower section 12 is formed to simulate the earth and preferably has the land and water of the earth shown in relief thereon as indicated at 13 and 14 respectively. The lower section also may be marked to indicate degrees of latitude and longitude as indicated at 15 and 16 respectively.

The device is provided with two bodies of liquids 17 and 18, as shown in Figure 2, and these liquids have different specific gravities whereby they are adapted to separate when the device is arranged in upright position as indicated. The bodies of liquid also are differently colored, and in Figure 2, the upper body 17 is indicated as being red while the lower body of liquid is indicated as being green. The colors indicated are suggested merely for the purpose of illustration and it will be apparent that any suitable colors may be selected. Any pair of liquids which are not miscible one with the other may be employed, and in practice water and coal oil have been found excellent for the purpose. Each liquid is provided with coloring matter which is not soluble in the other liquid, and hence the liquids are adapted to separate together with their coloring matters. If desired, the oil may have added thereto a deodorizing and denaturing agent, such as traces of essential oils or the like. It will be apparent that the quantity of the body of liquid 18 employed is preferably sufficient to exactly fill the lower container section 12 whereby the plane of division of the liquids will be at the bottom of the upper container section, hence these sections will present different colors to the eye and will simulate, in appearance, a pair of separate superimposed objects.

It will be apparent that the liquid is preferably sealed in the container, and any suitable sealing means may be employed. In the drawings a cork 19 is shown as closing the upper end of the container, and the tops of the cork and bottle may be sealed with sealing wax as indicated at 20.

The operation of the device will be apparent from the foregoing description. In making the article the heavier body of liquid 18 is first poured into the container to the level corresponding with the position of the lower end of the upper container section 11, whereupon the upper body of liquid is poured into the container and the latter sealed. Owing to the fact that the liquids employed are of different specific gravities, the liquids may be stirred up by inverting the bottle, and they will separate as soon as the bottle is placed in an upright position, as shown. Thus it will be apparent that the device presents an interesting novelty which may be used for advertising purposes, and the device readily may be shipped without permanently disturbing the relationship of the liquids and their coloring matters. When the device is used for advertising soft drinks or the like, the upper body of liquid 17 is preferably of a color corresponding to that of the soft drink which it is desired to advertise. While the container has been illustrated as simulating the earth with a bottle of a soft drink thereon, it will be apparent that the same inventive idea may be embodied in a container simulating any desired objects.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. An article of manufacture comprising a single transparent container formed to simulate a plurality of objects arranged one above the other, a body of liquid substantially filling the lower object and a second body of liquid contained in the upper object, the bodies of liquid being of different colors and specific gravities.

2. An article of manufacture comprising a single transparent container formed to simulate a plurality of objects arranged one above the other, and a plurality of bodies of liquid each substantially filling one of the objects simulated, said bodies of liquid being of different colors and specific gravities.

3. An article of manufacture comprising a single transparent container having an upper and a lower portion formed to simulate different objects, the lower object forming a base upon which a container is adapted to rest, and a pair of bodies of liquid arranged in said container, said bodies of liquid being of different colors and specific gravities, the heavier body of liquid being adapted to substantially exactly fill the lower simulated object.

4. An article of manufacture comprising a single transparent container formed to simulate a pair of objects arranged one above the other, and a pair of bodies of liquid each substantially filling one of the objects simulated, said bodies of liquid being immiscible and each provided with a coloring material soluble therein but insoluble in the other body of liquid.

In testimony whereof I affix my signature.

CLAUD A. HATCHER.